United States Patent
Shkredka

[15] 3,651,955
[45] Mar. 28, 1972

[54] WORKPIECE HANDLING AND PRODUCTION APPARATUS
[72] Inventor: Jurek Shkredka, Oakland, Calif.
[73] Assignee: Kaiser Aluminum & Chemical Corporation, Oakland, Calif.
[22] Filed: June 29, 1970
[21] Appl. No.: 50,661

[52] U.S. Cl. .............................214/1 P, 214/1 Q, 214/672
[51] Int. Cl. ..................................................B65g 7/00
[58] Field of Search ................214/1 R, 1 B, 1 P, 671, 672, 214/2.5, 1 A, 1

[56] References Cited

UNITED STATES PATENTS

| | | | |
|---|---|---|---|
| 505,749 | 9/1893 | Cardarelli | 214/672 |
| 3,412,876 | 11/1968 | Calabrese | 214/672 X |
| 2,582,329 | 1/1952 | Harter, Jr. et al. | 214/1 P |
| 2,639,829 | 5/1953 | Dempster et al. | 214/672 |
| 2,874,852 | 2/1959 | Frederick et al. | 214/1 Q |

Primary Examiner—Gerald M. Forlenza
Assistant Examiner—Frank E. Werner
Attorney—James E. Toomey, Paul E. Calrow, Harold L. Jenkins and John S. Rhoades

[57] ABSTRACT

Improved workpiece handling and production apparatus provided with a superstructure and a rack and guide assembly operatively associated therewith for effecting compound movement in and out of a workpiece treating station and orientation of one or more elongated workpieces relative thereto in order to effect selective treatment of a workpiece such as, for example, metal cladding of an I-shaped apertured steel rail member.

23 Claims, 17 Drawing Figures

FIG_13

3,651,955

WORKPIECE HANDLING AND PRODUCTION APPARATUS

BACKGROUND OF THE INVENTION

This invention relates to a workpiece handling and production apparatus. More particularly, it relates to an improved workpiece handling and production apparatus for selectively advancing and orienting an elongated workpiece relative to a workpiece treating station prior to and during feeding of the workpiece into and removal of the same from the workpiece treating station.

Various apparatus have been designed in the past for handling elongated workpieces such as oil drilling rigs that handle pipe sections. Examples of such apparatus are shown in U.S. Pat. No. 2,615,585 to Menhall, granted on Oct. 28, 1952, and U.S. Pat. No. 3,368,699 to Scaggs, granted on Feb. 13, 1968. Some of the principal deficiencies of such prior workpiece handling apparatus is that they were not concerned with positively, yet floatably, supporting a specially pretreated elongated workpiece while passing it through a workpiece treating station, and then withdrawing it from the work station all in a continuous and progressive manner with minimal overhead handling and in areas where space is at a premium. They were also not concerned with handling of pre or post metal clad articles where considerable care had to be exercised in the handling of the workpieces particularly after cladding lest the cladding material be adversely disturbed.

The improved workpiece production apparatus of the instant invention is provided with an improved superstructure and a unique rack and guide assembly operatively associated with the superstructure. This assembly is adapted to simultaneously pivotally support and transfer a plurality of elongated workpieces in an improved continuous and progressive manner from a workpiece loading position to a workpiece feeding position and then from an ejecting position to a storage position. In one operating position of the instant device workpieces are fed into and ejected out of a workpiece treating station where they are selectively treated such as, for example, clad with a special metal. In another position the workpieces are specially oriented for handling by another apparatus. Because the apparatus of the instant invention can precisely handle and orient a plurality of workpieces simultaneously relative to a workpiece treating station, the apparatus can advantageously be used to handle a substantial number of workpieces in a minimum amount of time.

SUMMARY OF THE INVENTION

The primary purpose of the instant invention is to provide an apparatus for simultaneously handling and transporting a plurality of workpieces from one workpiece processing station to another station and then back to the first station in order to selectively treat a plurality of work pieces simultaneously. The apparatus of the invention is particularly suitable for handling pre and post clad metal workpieces in an expeditious yet delicate manner whereby disturbance and injury to the cladding material are advantageously avoided.

The apparatus is generally comprised of a rack and guide assembly along with a carriage means. The carriage means engages a plurality of workpieces directly. A superstructure supports the rack and guide assembly.

The rack of the assembly can be advantageously provided with a workpiece positioning device as well as a workpiece holddown mechanism and workpiece swivel mounts are connected to the carriage for swivelly engaging the workpieces.

Special track means on the superstructure orients the rack and guide assembly and its carriage relative to a workpiece treating station so that when the carriage is released from a locked position on the rack and guide assembly at a certain time the carriage can lower and raise a plurality of rails into and out of a continuous casting station.

The apparatus is particularly useful with the "Cladding Mold System" disclosed in copending application, Ser. No. 881,169, filed Dec. 1, 1969.

DETAILED DESCRIPTION

With further reference to the drawings and particularly FIGS. 1, 5, 12 and 17, a preferred embodiment of the instant invention contemplates a workpiece handling and production apparatus 10 for simultaneously picking-up and moving a plurality of elongated rail workpieces W into and out of a metal cladding zone S.

Figures 1, 2, 3, 4:
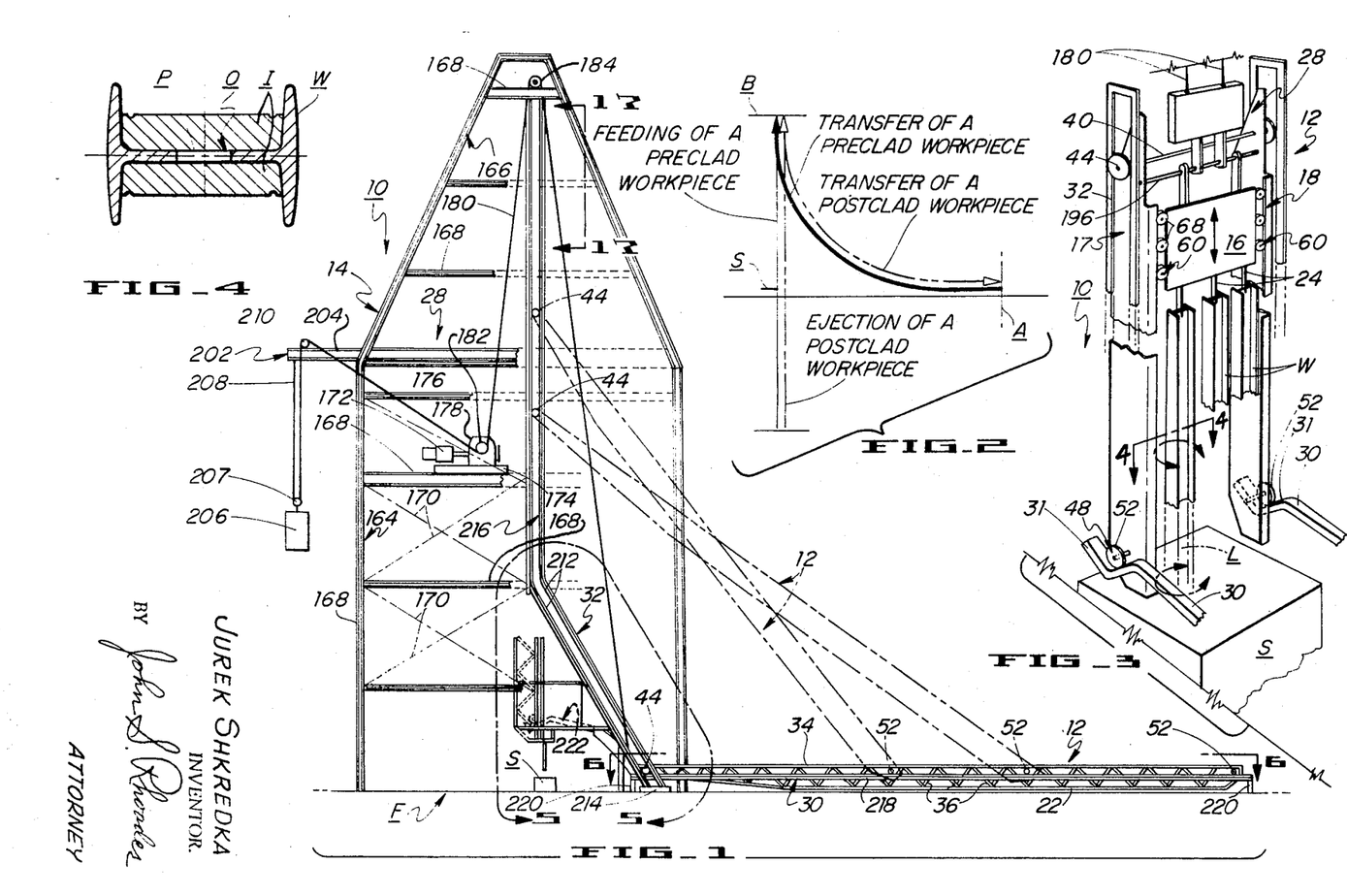
FIG. 1 is an overall side elevational view with parts broken away of a preferred embodiment of the rail workpiece handling apparatus of the instant invention.
FIG. 2 is a graphical illustration of the general paths of travel taken by a pre-clad and post-clad workpiece during operation of the apparatus of the instant invention.
FIG. 3 is an enlarged fragmentary and broken perspective view of the structure of FIG. 1.
FIG. 4 is an enlarged cross sectional view taken along line 4—4 of FIG. 3 and with the cladding added to the rails.

More specifically and as schematically indicated in FIG. 2, the apparatus 10 transfers six elongated un-clad workpieces W from a horizontal position A to an upstanding position B disposed above and generally aligned with the workpiece pass line of station S. When individual workpieces are first located in position B, the apparatus directs the workpieces into cladding station S. After cladding, the workpieces are raised up and then returned to their original position A where they can be picked up by another device.

Apparatus 10 generally comprises a rack and guide assembly 12 (best shown in FIGS. 6–7 and 12) mounted in a superstructure 14. A carriage 16 is selectively connected to the guides 18 of the assembly 12 for advancement between the longitudinal ends thereof upon disconnection of the carriage from the rack 17 of the assembly 12.

Figure 8:
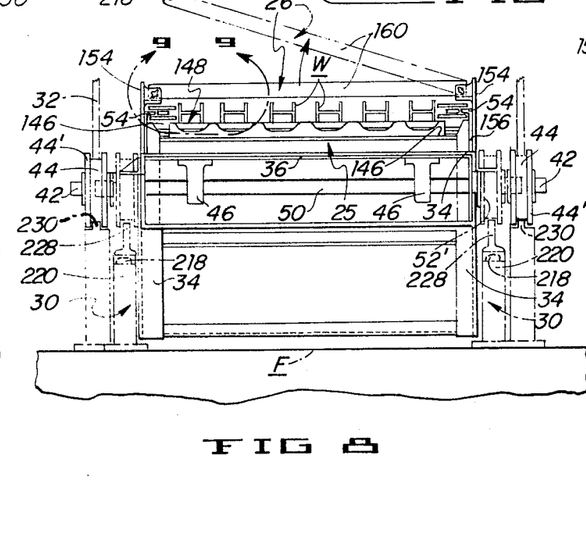
FIG. 8 is a view with parts added taken along line 8—8 of FIG. 7.
Figure 9:
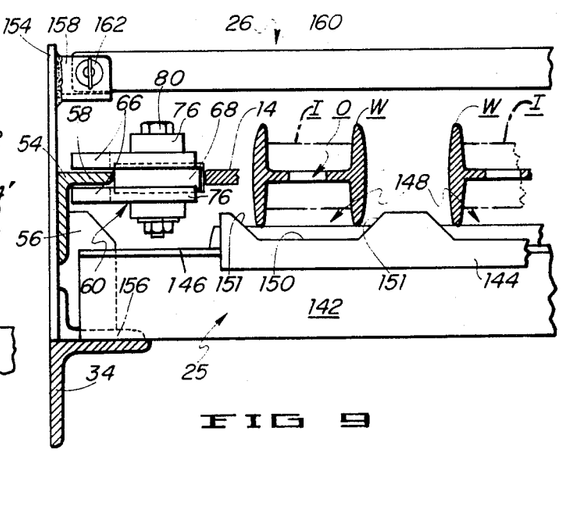
FIG. 9 is an enlarged end elevational view taken within the bounds of line 9—9 of FIG. 8.
Figures 10, 11:
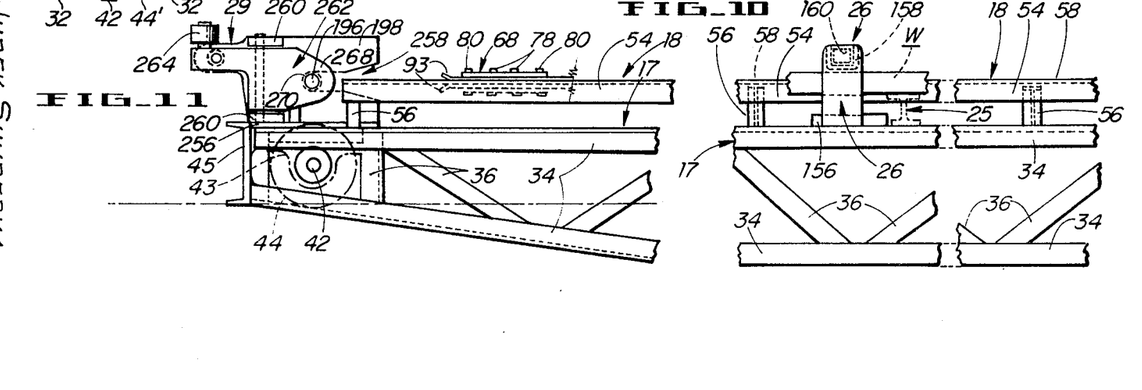
FIG. 10 is an enlarged fragmentary side elevational view with parts added taken within line 10—10 of FIG. 7.
FIG. 11 is an enlarged side elevational view taken within line 11—11 of FIG. 7.

As indicated in FIGS. 3, 12 and 15–16, a swivel lock device 24 firmly yet freely locks each workpiece W to carriage 16. As indicated in FIGS. 8–10, one or more workpiece positioning and guide devices 25 can be provided on the rack 17 for use in moving a workpiece W between positions A and B and for guiding the workpiece W into and out of work stations S when the rack and guide assembly is in position B. If desired, a holddown device 26 can be used in combination with device 25 for preventing excessive swiveling of a workpiece W during operation of the apparatus.

A cable hoist mechanism 28 best shown in FIGS. 1, 5, 12 and 17 is mounted on the superstructure and connected to both carriage 16 and rack 17. Hoist mechanism 28 is used for hoisting the carriage together with the rack and guide assembly from positions A to B and vice versa, and for selectively raising and lowering the carriage relative to the rack and guide assembly and relative to station S when the rack and guide assembly is in position B. The cable-connected end of rack 17 is advantageously provided with a cam-operated latch mechanism 29 (see FIGS. 11–12 and 17) for engaging a cam 29' at the upper end of the superstructure so as to effect disconnection of the carriage from the rack when the rack and guide assembly is in position B. Upon disconnection of carriage 16 from rack 17, carriage 16 can be selectively advanced along guide 18 of assembly 12 upon further operation of the hoist mechanism when rack and guide assembly 12 are in position B.

Figure 5:
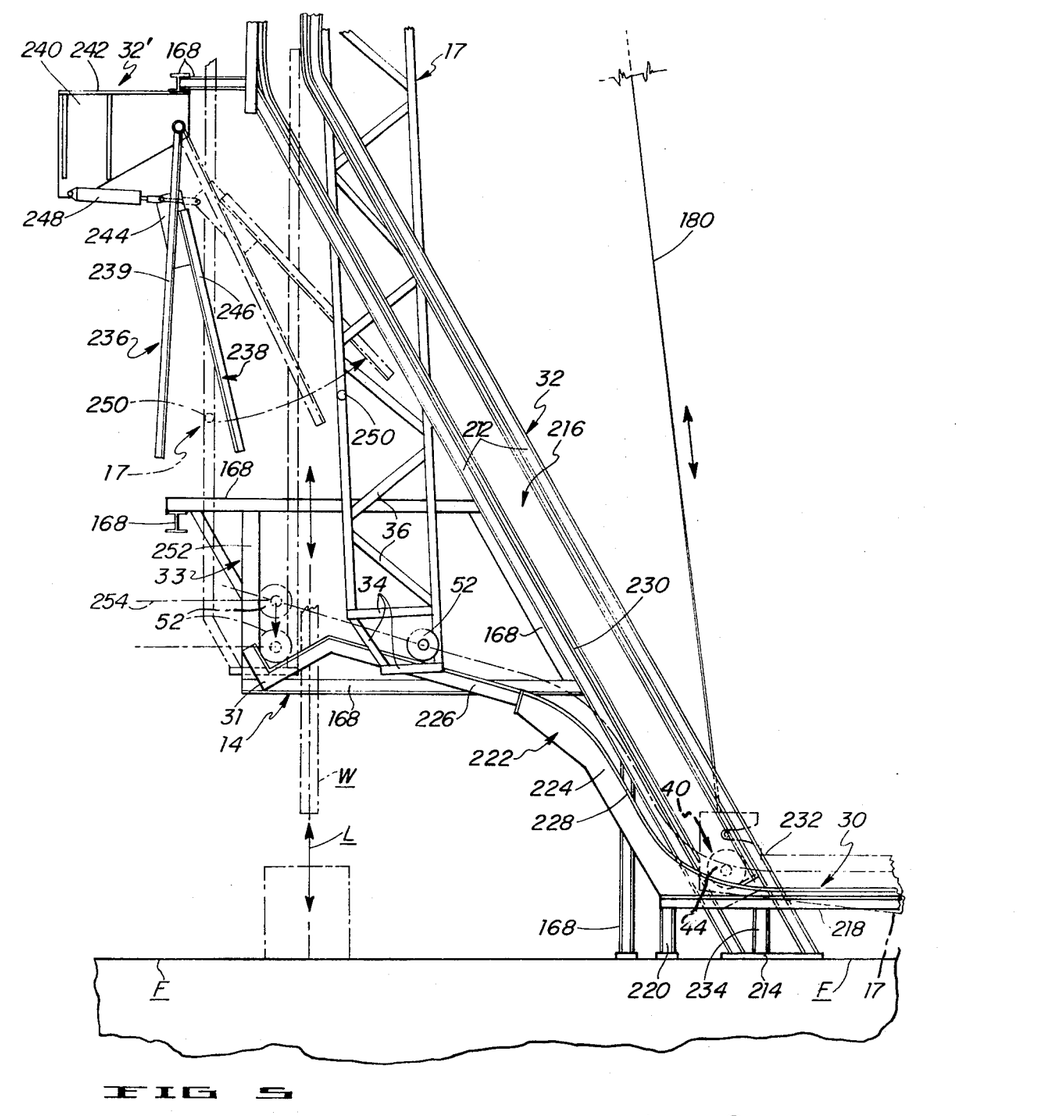
FIG. 5 is an enlarged side elevational view taken within line 5—5 of FIG. 1.

Inner and outer pairs of tracks 30 and 32 of generally curvilinear but somewhat different shape as best depicted in FIGS. 1, 3, and 5, are advantageously connected to the superstructure for supporting and engaging the rack and guide assembly 12 in order to generally orient the rack and guide assembly between A and B positions. The hook and pusher device 32' of FIG. 5 engages the cable-free or lower end of rack 17 when rack 17 is in position B and acts to draw the cable-free end of the rack into alignment with the upper and inner V-shaped ends 31 of the inner pair of tracks 30. This brings about a precise orientation of the rack and guide assembly 12 in position B prior to the selective lowering and raising of carriage 17 together with a workpiece W relative to station S.

Although not shown in the drawings, it is to be understood that work station S can be provided with one or more openings having pass lines L for receiving workpieces W upon their being fed to and removed from station S which contains a suitable cladding guide and mold arrangement such as that noted in the aforementioned patent application.

The workpieces W can be attached to and disconnected from swivel lock devices 24 when assembly 12 is in horizontal position A.

The rails W as handled by the instant equipment are usually on the order of 40 or more feet in length and because of manufacturing procedures can vary somewhat in geometrical shape from rail to rail. Regardless of such variations, a plurality of such workpieces can be simultaneously handled by the apparatus of the invention.

The particular manner in which the cladding of a rail is effected at station S does not constitute part of the instant invention and reference is made to the aforementioned application for further details of a suitable cladding mold system that can be employed at station S for effecting cladding of the workpiece. On the other hand, the instant apparatus plays a significant part in maintaining proper alignment of many rails with the cladding molds as the many rails are simultaneously passed through the cladding zone.

In an advantageous embodiment of the invention, rack 17 can be comprised of a plurality of L-shaped chordal members 34 and a series of reinforcing strut members 36 all as illustrated in FIGS. 1, 6–7 and 10–14. An idler wheel assembly 40 is connected to the cable-connected end of the rack and guide assembly in a direction generally transverse of the longitudinal axis 41 thereof. The assembly includes a shaft 42 intermediate and spaced portions of which are journalled in brackets 43 and wheels 44 are connected to the ends of shaft 42. If desired and as noted in FIG. 11, the cable-connected end of rack 17 may include a channel-shaped reinforcing element 45. As with the first idler wheel assembly 40, a second idler wheel assembly 48 includes a shaft 50 journalled in brackets 46 at the cable-free end of rack 17 in the manner best shown in FIGS. 8 and 12 and wheels 52 are connected to the opposite ends of shaft 50. Shafts 42 and 50 have different lengths whereby the wheels 44 and 52 of the various assemblies are offset relative to each other and can engage different pairs of tracks 32 and 30 as the rack and guide assembly 12 moves from a horizontal position to an upstanding position and vice versa during operation of the apparatus as will become more fully apparent hereinafter.

Guide 18 of assembly 12 preferably includes a series of longitudinally spaced and aligned L-shaped elements 54 disposed on opposed sides of rack 17 and at the top or outwardly facing side thereof. As indicated in FIGS. 7–13, at least one pair of relatively spaced T-shaped stub elements 56 extend between and are connected to intermediate portions of an upper side edge chordal member 34 of rack 22 and the vertical leg section of an L-shaped guide element 54 of a series of guide elements whereby a given guide element 54 is held in spaced and parallel relation to its associated and upper side edge chordal member 34 of rack 17. Moreover, as best shown in FIG. 8, the upper horizontal and inwardly directed leg sections 58 of both series of guide elements 54 on opposed sides of rack 17 lie in a substantially common plane which is disposed above and in parallel spaced relation to another plane that passes in median fashion through the upper and opposed side edge chordal members 34 of rack 17. The opposed leg sections of guide elements 54 support and slidably engage workpiece carriage 16 during the selective advancement thereof in either direction between the opposite longitudinal ends of rack and guide assembly 12 as will now be described.

Carriage 16 is preferably of a one-piece steel plate construction with a width that is somewhat less than the distance between opposed inwardly directed side edges of leg sections 58 of the various opposed guide elements 54. A wheel and guide device 60 attached to each side edge of carriage 16 allows the carriage to be freely and slidably connected to opposed guide elements 54 on guide 18 of assembly 12.

As indicated in FIGS. 3 and 9–14, device 60 is generally comprised of opposed strap elements 66 and two pairs of wheels 68 operatively associated therewith. Adjacent inner side edges of opposed strap elements 66 of a given guide device 60 are partially cut to define opposed and generally longitudinally aligned grooves 70 of approximately U-shaped configuration. An opposed side edge of carriage 16 is selectively cut away so as to define a plurality of four inwardly extending, relatively spaced and longitudinally aligned grooves 72. If desired, the endmost groove of the various grooves 72 at a righthand corner of carriage 16 as viewed in FIG. 12 can be of less extent than the other grooves. Each groove 72 is a U-shape similar to groove 70 for a strap element 66 of a guide device 60.

Figure 12:
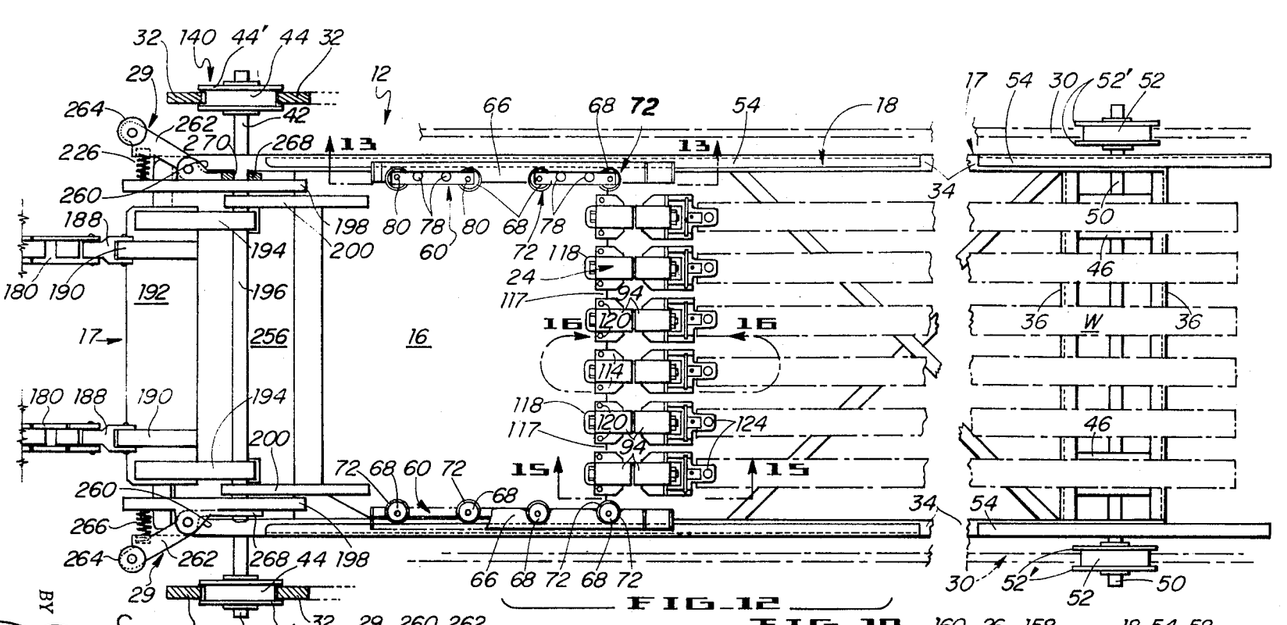
FIG. 12 is an enlarged and fragmented top plan view of the structure of FIG. 6, with parts added and other parts broken away and shows various details of the rack and guide assembly.
Figures 13, 14:
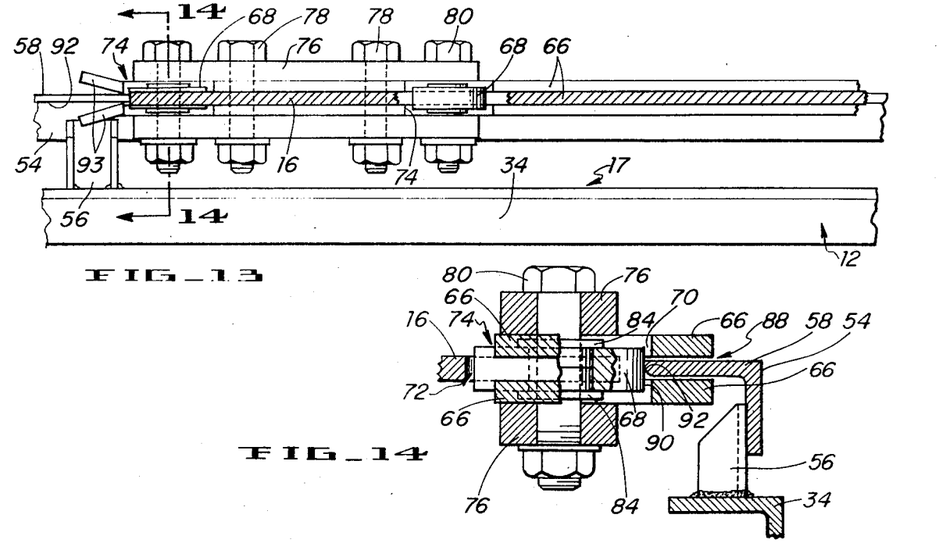
FIG. 13 is an enlarged sectional view along line 13—13 of FIG. 12 with parts broken away.
FIG. 14 is an enlarged sectional view taken along line 14—14 of FIG. 13 and with parts broken away.
Figure 15:
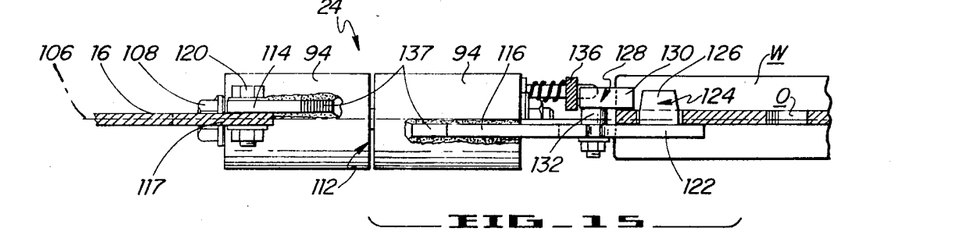
FIG. 15 is an enlarged sectional view taken along line 15—15 of FIG. 12.

As best illustrated in FIGS. 11 and 14, each opposed major face of the carriage at one of the opposite side edges thereof is interposed between and is in clamping engagement with the inner and underneath side edge portions of one of the opposed strap elements 66 of a given guide device 60. During overlapment of opposed strap elements 66 with opposed major faces of carriage 16 at a side edge thereof, the grooves 70 of opposed strap elements 66 are aligned relative to each other in such fashion that a groove 70 of one strap element 66 is axially aligned with a groove 70 of the opposed strap element so that opposed grooves of opposed straps 66 are aligned in paired relationship. At the same time, an axially aligned pair of grooves 70 of opposed straps 66 of a given device 60 are coaxially aligned with their respective groove 72 of the carriage to define a common opening 74 that fully extends between the top and bottom of opposed straps 66 of a device 60 disposed at a side edge of the carriage in the manner shown in FIG. 14. A U-shaped groove 70 or 72 as provided on a strap element 66 or a side edge of carriage 14 has a radius slightly greater than the radius of a wheel 68 of a given guide device 60 whereby the wheel can be freely and rotatably received within a common opening 74 in the manner depicted in FIGS. 9 and 12–14.

Bar elements 76 are disposed at either longitudinal end of a given guide device 60 and are adapted to be securely attached to opposed strap elements 66 thereof by means of cap screw assemblies 78 passed through aligned openings in opposed strap and bar elements 66 and 76 and the associated side edge of the carriage at either longitudinal end of a device 60. The length of a bar 76 is such that either longitudinal end of a given bar element 76 partially closes off the adjacent end of a common opening 74 as best shown in FIGS. 12–14. Because of such partial closure of a common opening 74, opposed bar elements 76 of a given device 60 rotatably support a wheel 68 in an associated common opening 74 when a cap screw assembly 80 is passed through opposed bar elements 76 of a device 60 and the hub of a wheel 68. If desired, a flanged sleeve bearing 84 can be interposed between a bar element 76 and the associated hub portion of a respective wheel as shown in FIG. 14.

By reason of a side edge of carriage 16 being overlapped and interposed between opposed strap elements 66 of a device 60, oppositely facing inner major surface portions of opposed straps 66 define a gap 88 that extends fully between the longitudinal ends of the opposed strap elements at either side edge of the carriage 16. As indicated in FIG. 14, the horizontal leg section 58 of a guide element 54 has a thickness somewhat less than the thickness of carriage plate 16 whereby the horizontal leg section of a guide element 54 can be freely inserted in an appropriate manner into gap 88 adjacent a given side edge of the carriage when opposed strap elements 66, etc., of a guide device 60 are attached to the given side edge of the carriage as aforedescribed.

Figure 6:
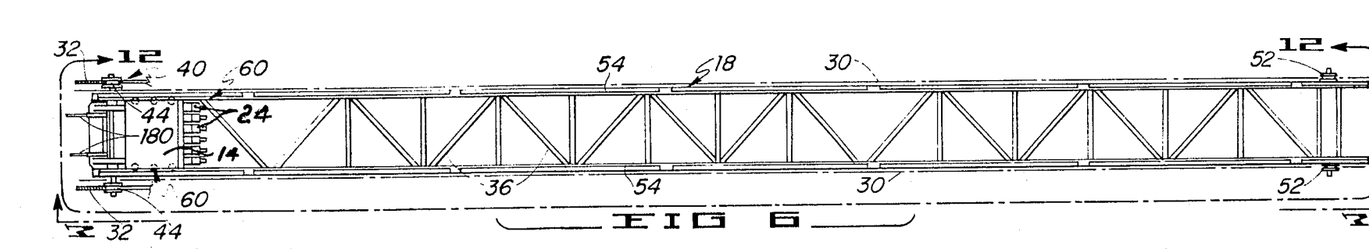
FIG. 6 is an enlarged plan view taken along line 6—6 of FIG. 1.

The outer peripheral surface portions 90 of a wheel 68, when rotatably mounted within a common opening 74 on opposite sides of the carriage, define the bottom depth limits of the associated gap 88. As indicated in FIGS. 12 and 14, the transverse distance between the opposed outer peripheral surface portions 90 of wheels 68 of carriage 14 is somewhat less than the transverse distance between opposed inner edges 92 of the horizontal leg sections 58 of opposed guide elements 54. Thus, both series of wheels 68 on opposed sides of the carriage and the opposed strap elements 66 on opposed sides thereof rollingly engage leg sections 58 of guide elements 54 and enable the carriage to be freely and selectively advanced in a continuous fashion without binding in either direction between the ends of the guide 18. As indicated in FIGS. 6 and 12, the longitudinal distance between an adjacent pair of wheels 68 of the two pairs thereof of a guide device 60 on either side edge of carriage 14 is no less than the distance between adjoining ends of adjacent guide elements 54 of the series of guide elements on either side of the guide 23 of the rack and guide assembly thereby assuring smooth transfer of an opposed side edge of the carriage between adjoining guide elements 54 during advancement of the carriage between opposite ends of the rack and guide assembly. As best indicated in FIGS. 9–11 and 13–14, posts 56 which support guide elements 54 have a sufficient height to assure adequate clearance between wheel and guide devices 60 and the upper side edge of chordal members 34 of rack 17. Thus, advancement of the carriage between the ends of the rack and guide assembly is not obstructed or otherwise inhibited during operation of the apparatus. If desired, the longitudinal end of a strap 66 of a guide device may be bent upwardly and outwardly in the manner illustrated at 93 in FIGS. 11 and 13 so as to facilitate smooth transfer of the carriage between adjoining guide elements 54 on opposed side edges thereof.

Figure 16:
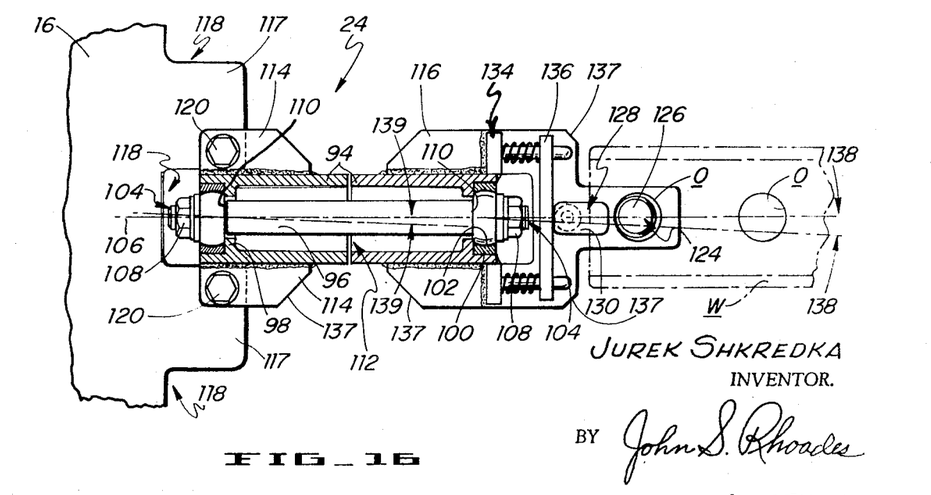
FIG. 16 is an enlarged fragmented plan view taken within circumscribing line 16—16 of FIG. 12 with portions broken away.

In another advantageous embodiment of the invention and as indicated in FIGS. 3, 6, 12 and 15–17, a plurality of workpiece swivel and pivotal mounting devices 24, e.g., six, are preferably connected to the cable-free longitudinal end of the carriage. For the sake of brevity, only three swivel devices 24 are diagrammatically shown in FIG. 3. A workpiece mounting device 24 includes a pair of open-ended and generally axially aligned sleeves 94. An axle shaft 96 extends between the outer opposed ends of the adjoining sleeves and is concentrically disposed in the common interior between the outer opposed ends thereof as best illustrated in FIG. 16. The outer end of either sleeve 94 includes an inwardly directed radial annular flange 98 integrally connected to the interior cylindrical surface of each sleeve 94 and disposed axially inward of the outer end thereof. A bearing assembly 100 having inner and outer races with mating bearing surfaces 102 of segmented spherical shape are forceably fitted in the interior opening of either adjoining sleeve 94 at the outer end thereof until a given bearing assembly 100 abuts its respective flange 98 in the associated sleeve thereby precisely positioning the bearing assembly therein.

During forceable fitting of the bearing assemblies to opposed outer ends of adjoining sleeves 94, a given outer reduced end 104 of shaft 96 is inserted in an appropriate manner in and through the central opening of the inner race of its associated bearing assembly 100 whereby adjoining sleeves 94 at the outer opposed ends thereof are swively connected about the longitudinal axis 106 of shaft 96 at the reduced or longitudinal ends thereof. Nut assemblies 108 attached to the longitudinal ends of shaft 96 securely hold adjoining sleeves 94, shaft 96 and bearings 100 all together in the assembled manner. The axial distance between the shoulders 110 of shaft 96 is greater than double the axial distance between the outwardly facing annular end face of flange 98 of an adjoining sleeve 94 and the inner non-flanged end thereof whereby adjacent inner non-flanged ends of adjoining sleeves are separated from each other by a slight gap 112 when the adjoining sleeves are assembled to shaft 96 as aforedescribed. The gap 112 for a reason that will become more apparent hereinafter advantageously restricts swiveling of the longitudinal axis of a sleeve 94 in an angular direction about the longitudinal axis 106 of shaft 96 to a predetermined amount.

A pair of lugs 114 are disposed above the longitudinal axis of the left-hand sleeve and affixed to left-hand sleeve longitudinally thereof in chordal fashion while the right-hand sleeve fits in the recess of a fork element 116. The fork portions of fork element 116 are offset below the longitudinal axis of right-hand sleeve 94 and affixed to this sleeve. Since lugs 114 and fork 116 are offset on opposite sides of the longitudinal axis of a device 24, the longitudinal axis of a workpiece W is substantially aligned with the median longitudinal plane of carriage 16 in the manner shown in FIG. 15 during operation of the apparatus for a reason that will become more apparent hereinafter.

The cable-free end of carriage 16 is provided with a plurality of similar tongues 117, e.g., seven, each of which is separated from an adjacent tongue by a groove 118. Lugs 114 of left-hand sleeve 94 of a given device 24 are affixed to adjacent tongue portions 117 by cap screw assemblies 120 fitted in aligned openings in lugs 114 and the tongue portions 117.

The stem 122 of fork 116 of the right-hand sleeve 94 is releasably and pivotally connected to a rail workpiece W and a pin 124 having a frusto-conically shaped head portion 126 is suitably affixed to the outer end of fork 116. The frusto-conically shaped head of a pin 124 has a diameter at any point thereon which is less than the diameter of an aperture O of a rail W. This means that one end of a rail W can be pivotally connected to a device 24 upon insertion of the head portion 126 of the pin of the device in and through an aperture of the rail W located adjacent to the rail end.

An assembly 128 having a lug 130 at its upper end is rotatably connected between the junction of fork and stem portions of the fork 116 of a given device 24 in such fashion that the lug end can be rotated to overlappingly engage the adjoining and outwardly facing web of rail W and clampingly hold the adjacent web end of the rail against the underlying stem portion 122 of device 24.

If desired, a washer 132 can be inserted between the lug 130 of a device 24 and the stem portion 122 thereof. A keeper 134 is mounted on the stem portion of a device 24 and is generally comprised of a bar 136 for biasingly engaging the lug 130. Biased engagement of the keeper bar with lug 130 results in the lug remaining in a rail holding position and prevents accidental disconnection of the rail from the device during hoisting of the rack and guide assembly together with a workpiece from positions A to B in FIG. 2. Various outer corner edges of lugs 114 and of fork 116 of a device 24 may be beveled as indicated at 137 in FIGS. 15–16.

Since left-hand sleeve 94 is affixed to the cable-free end of carriage 14, the right-hand sleeve 94 is free to swivel about the right end of shaft 96 as viewed in FIG. 16 while the left end of shaft 96 is free to swivel about the longitudinal axis of left-hand sleeve 94. In one operative embodiment of the instant invention a gap 112 of about one-eighth of an inch between adjacent inner ends of adjoining sleeves 94 of a device 24 has been found sufficient to limit angular swiveling of the right-hand sleeve about the axis of shaft 96 to an angle on the order of 7° as indicated at 138 in FIG. 16. Moreover, a ⅛-inch gap between adjoining sleeves 94 of a device 24 will also limit angular swiveling of shaft 96 about left-hand sleeve 94 to an angle of about 7° as indicated at 139 in FIG. 16. Thus, the ⅛-inch gap between adjoining sleeves of a device 24 effectively limits excessive swiveling of a workpiece rail W about the device during the operation thereof.

The apparatus of the instant invention advantageously provides a workpiece positioning and guide mechanism 25 for the rack of rack and guide assembly 12 as illustrated in FIGS. 8–10. The mechanism is preferably comprised of an I-shaped beam 142 and a multi-grooved template 144. The I-shaped beam extends transversely of and is connected to upper and opposed rack members 34. An intermediate section of the upper flange of beam 142 is cut away to facilitate attachment of the multi-grooved template 144 to the upper edge of the beam web and between beam flange portions 146. The upper edge of template 144 is provided with divergent upward and outward portions 151 interconnected by edge portion 150 and defining a trapezoidally shaped groove 148. As indicated in FIGS. 8–9, the transverse dimension of a rail workpiece W is of less extent than the major dimension of a groove 148. Since the major dimension of a groove 148 is of greater extent than a transverse dimension of a workpiece W, the edge portions 150, 151 of template 144 defining a groove 148 will cooperate to nestingly engage certain flange portions of a rail along the length thereof not only for the purpose of initially centering the rail when the rail is loaded onto the rack and guide assembly at position A but also for directly supporting the rail when it is moved from positions A to B and vice versa during operation of the apparatus. On the other hand, upper edge portions 150 and 151 of template 144 defining a given rail receiving groove 148 advantageously serve to slidably engage and guide various flange portions of a rail along its length upon raising and lowering of the rail into and out of work station S relative to its associated template groove 148 when rack and guide assembly 12 is in B position during operation of apparatus 10.

If desired, a workpiece holddown 26 may be used in combination with a workpiece positioning and support mechanism 25. Holddown 26 is generally comprised of opposed upstanding mounting plates 154 individually connected to intermediate portions of upper and opposed side edge chordal members 34 of rack 17 in the manner illustrated in FIGS. 8–10. Opposed mounting plates 154 of a holddown 26 may be disposed in offset relation to an adjacent workpiece positioning mechanism 25 as best indicated in FIG. 10.

An L-shaped gusset 156 can be provided, if desired, for reinforcing the connection between a mounting plate 154 and a rack member 34. An upwardly facing U-shaped bracket 158 may be affixed to the inwardly facing side of plate 154 and a hollow workpiece holding bar 160 extending between opposed plates can be loosely inserted in the recesses of opposed brackets 158. A wing-nut cap screw assembly 162 connected to either bracket 158 releasably locks the opposed ends of bar 160 to the brackets 158, whereby one end of the bar can be selectively pivoted relative to the other end thereof during loading and/or unloading of workpieces from rack and guide assembly 12 when the rack and guide assembly is in position A.

As best indicated in FIGS. 8–10, opposed plates 154 are of such a height relative to the overall thickness of a rail W that the bar in being disposed between the upper ends of opposed plates 154 provides adequate clearance not only for swiveling a rail between the bar and the template of support mechanism 25 but also for preventing excessive swiveling of the rail when the rack and guide assembly is in upstanding position B during feeding of the workpiece into and out of station S. Although only one workpiece positioning guide and support mechanism 25 and only one workpiece holddown 26 has been shown in FIGS. 8–10, it is to be understood that any suitable number of support mechanisms 25 and holddown assemblies 26 and various combinations thereof can be used with the apparatus of the instant invention.

In another advantageous embodiment of the instant invention, the skeletal superstructure 14 is comprised of a lower box-like section 164 and an upper pyramidal-like section 166. Sections 164 and 166 are made up of a plurality of interconnected girders 168. If desired, certain girders 168 can be reinforced by adjustable rod-like struts all as diagrammatically indicated at 170 in FIG. 1. The superstructure has a height above the floor F sufficient to elevate the rack and guide assembly from the lower horizontal position A to the desired upstanding higher position B and vice versa. When rack and guide assembly is in position A, it is disposed adjacent to and substantially at right angles to a pass line L of work station S. When rack and guide assembly is in position B, it is disposed above and in general alignment with the pass line L. In order to effect elevation of the rack and guide assembly between positions A and B, the superstructure is advantageously provided with the above-noted cable hoist mechanism 28 now to be discussed in detail.

Mechanism 28 is generally comprised of a power driven winch 172 mounted on a platform 174 supported by certain cross girders 168 in the lower section 164 of superstructure 14. Winch 172 drives a cable and pulley system 176 made up of a pair of chain link cables 180 and a common drive pulley 182. The drive pulley is suitably connected to the output shaft of gear assembly 178. It is to be understood that one end of each cable 180 of the pair of cables is wrapped about common pulley 182 in a counterclockwise direction and in laterally spaced relation to the other cable of the pair thereof in an appropriate manner as viewed in FIG. 1. A pair of upper idler pulleys 184 are connected to a shaft 186 rotatably mounted in conventional fashion at the top or apex end of upper section 166 of structure 14 in the manner shown in FIGS. 1 and 17. The intermediate portions of a pair of cables 180 are partially wrapped about the upper peripheral portion of their respective pulleys 184.

Figure 17:
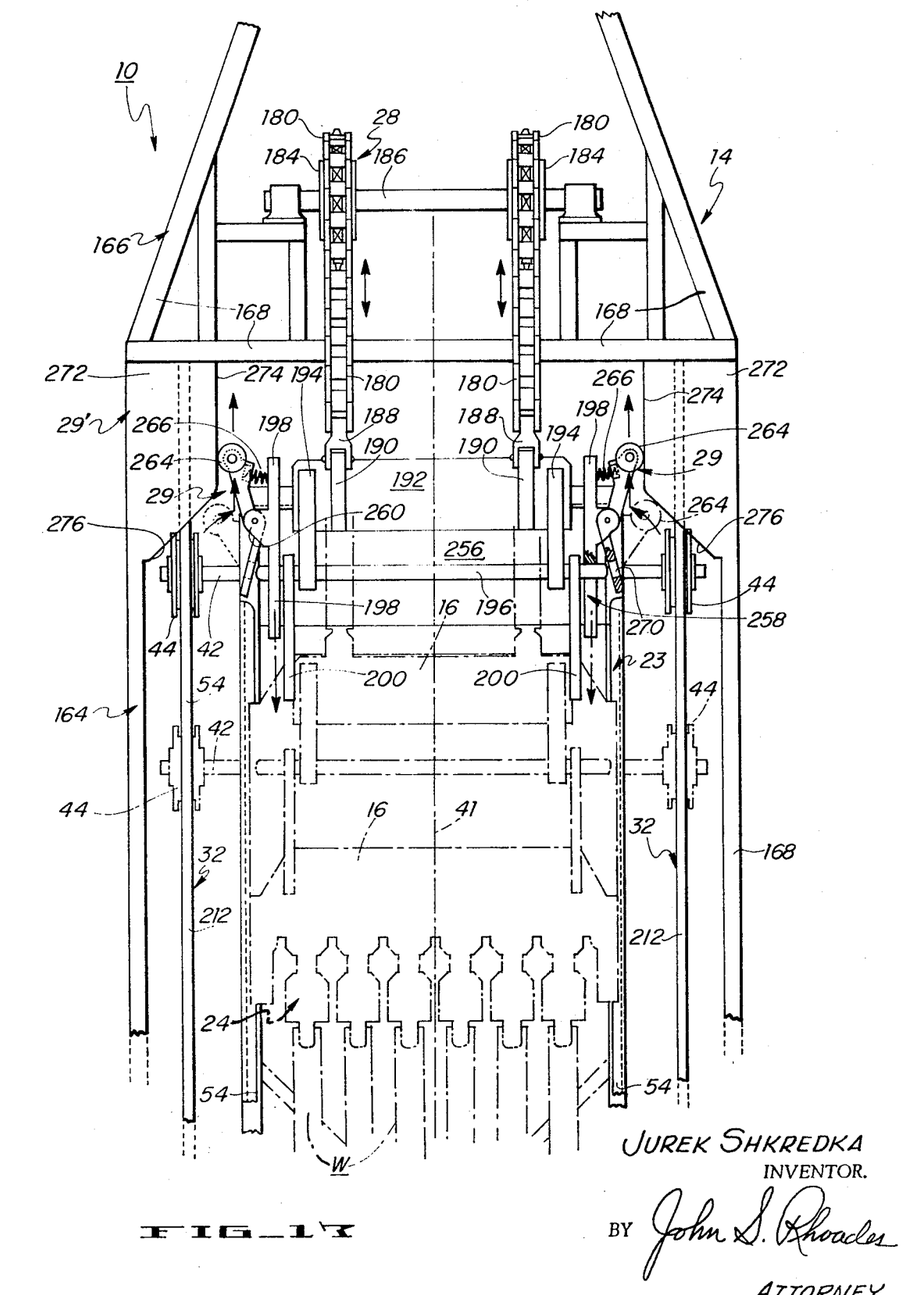
FIG. 17 is an enlarged view taken generally along line 17—17 of FIG. 1, and illustrates certain features of the rack and guide assembly of the apparatus.

The outer ends of the cables are advantageously connected in a unique manner to rack and guide assembly 12. To this end the outer endmost links of a given cable 180 is provided with a forked portion 188 for effecting pivotal connection to the cable-connected end of a bar 190. The bars 190 operatively associated with both cables 180 are in turn affixed in parallel spaced relation to each other and at opposite ends of plate 192. Another pair of bars 194 are affixed to the opposite ends of plate 192 on the one side thereof and disposed outwardly of the first pair of bars in parallel spaced relation to each other. The carriage facing ends of the second pair of bars 194 extend beyond plate 192 as indicated in FIGS. 6, 12 and 17. A shaft 196 extending in a direction transversely of the rack and guide assembly 12 is pivotally connected at intermediate portions thereof to the carriage facing ends of the second pair of bars 194 while also being connected at its outer ends to a pair of slotted plates 198. These plates advantageously form part of latch mechanism 29 that effects selected connection of the shaft to rack 17 of the rack and guide assembly for reasons that will become more apparent hereinafter.

By reason of the outer ends of the pair of cables 180 being pivotally interconnected to shaft 196 by the first and second pairs of bars 190 and 194, etc., the outer ends of the cables are advantageously stabilized against excessive flexing and disconnection from upper idler pulley 184. Because of the stable connection of the cables to the rack and guide assembly as aforedescribed, the rack and guide assembly can be hoisted between positions A and B and vice versa without damaging the workpieces suspended from the rack and guide assembly upon actuation of power winch 172.

Carriage 16 of the rack and guide assembly is uniquely connected to shaft 196 by means of U-shaped straps 200. During connection of the ends of a given U-shaped strap 200 to carriage 16, the intermediate portions of shaft 196 are inserted in the recess of the strap until the U-shaped or intermediate portion of the strap is wrapped about the intermediate portion of shaft 196 at its one end all as indicated in FIGS. 12 and 17. By reason of the carriage being connected to shaft 196 by straps 200, the carriage is floatingly held by way of opposed wheel and guide devices 60 between opposed guide elements 54 of guide 18 of the rack and guide assembly at the cable-connected end thereof when the rack and guide assembly is hoisted by cable hoist mechanism 28 between positions A and B and vice versa. This floating suspension of the carriage assures that cable-hoist mechanism 28 can further function to freely raise and lower the carriage between opposite ends of the rack and guide assembly when the rack and guide assembly is disposed in the B position as will be more fully set forth below.

The cable winch mechanism 28 may be advantageously provided with a counterweight arrangement 202 as indicated in FIG. 1 to effectively counterbalance the overall weight of the rack and guide assembly between positions A and B. The counterweight arrangement is generally comprised of a platform 204 connected to certain cross girders 168 (only one of which is shown in FIG. 1) at the junction between sections 164 and 166 of structure 16. The left-hand end of the platform extends outwardly of the structure on the left-hand side thereof as viewed in FIG. 1. A suitable counterweight 206 is provided with an idler pulley 207 for conventional connection to an intermediate portion of a cable 208. One end of cable 208 is anchored to platform 204 and the other end is partially wrapped about an idler pulley 210 mounted on platform 204 prior to being wrapped about drive pulley 182 in a counterclockwise direction. Thus, when winch 172 drives pulley 182 in a clockwise direction in order to progressively raise the rack and guide assembly from position A to B, the counterweight would be progressively lowered and counterbalance the weight of the rack and guide assembly. On the other hand, when the power winch is actuated to drive the pulley in a counterclockwise direction as viewed in FIG. 1, the counterweight would be progressively raised while the rack and guide assembly would be progressively lowered from position B to A. The power winch mechanism 172 can be provided, of course, with the usual brake device (not shown) for positively holding the rack end guide assembly in any desired intermediate position between full positions A and B.

In still another advantageous embodiment of the apparatus of the instant invention, inner and outer pairs of tracks 30 and 32 are provided to further stabilize and generally orient the rack and guide assembly between positions A and B upon actuation of the power winch mechanism. As noted above, the inner and outer pairs of tracks 30 and 32 are of different curvilinear shape and overall extent. They are adapted to be engaged by the pairs of wheels 44 and 52 of rack 17. Although the pairs of tracks 30 and 32 are of different extent, etc., they are disposed in aligned and parallel spaced relation to each other for effecting advancement of the rack and guide assembly 12 between positions A and B in a smooth and continuous fashion as will now be described.

Each outer track 32 is made up of track sections 212 of approximately V-shaped configuration. In connecting the upper and lower ends of the V-shaped sections 212 of an outer track 32 to an upper cross girder 168 and a floor support bracket 214, these sections 212 are arranged in parallel and spaced relation so as to define a closed somewhat V-shaped loop 216 of substantially uniform width. The V-shaped sections 212 of one outer track are arranged in transverse alignment to the opposed V-shaped sections of the other outer and opposed track 32 when the two pairs of V-shaped sections of the pair of outer tracks 32 are connected to upper cross girder 168 and their respective floor bracket 214 all as shown in FIGS. 1 and 5. Wheel 44 at the cable-connected end of the rack and guide assembly has a diameter that corresponds to the width of the closed loop 216 of an outer track 32 so that the opposed wheels 44 of the rack and guide assembly can roll freely in their respective closed loop 216 of the outer tracks 32 in the manner shown in FIGS. 1, 3, 8 and 17. As indicated in FIGS. 1-2, intermediate portions of the inner V-shaped section 212 of the outer tracks 32 are connected to various cross and upright girders 168 of structure 16 for reinforcement purposes.

Figure 7:
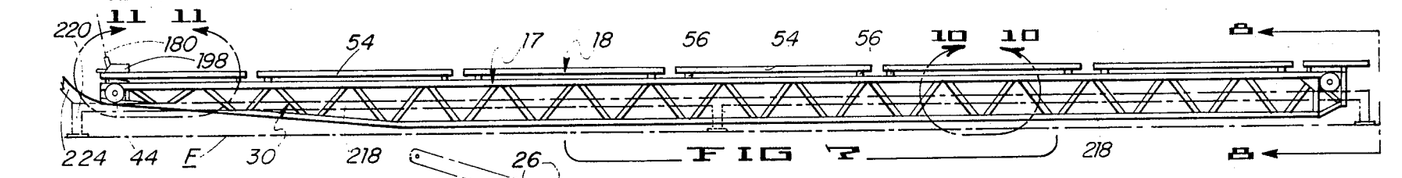
FIG. 7 is a view taken along line 7—7 of FIG. 6.

On the other hand, as noted in FIGS. 1, 5 and 7, the inner pair of tracks 30 include rightwardly extending elongated linear sections 218 disposed in parallel and transversely aligned relation to each other. A plurality of stanchions 220 support either inner track section 218 above floor F.

The left-hand section 222 of a given inner track 30, as viewed in FIGS. 1, 3 and 5, is comprised of a sinusoidal S-shaped portion 224 and an upwardly and outwardly inclined linear section 226 connected thereto. The left-hand end of the linear section 226 of a given inner track 30 terminates in the aforementioned V-shaped portion 31. The inner pair of tracks 30 are adapted to be rollingly engaged by wheels 52 at the cable-free end of the rack and guide assembly when rack and guide assembly is moved from position A to position B, e.g., by way of the power winch 172, etc.

It is to be understood that for reinforcement purposes various portions of the left-hand section 222 of either inner track 30 are connected to girders (not shown) of the lower section 164 of structure 16. In order to maintain rolling contact of assembly wheels 52 and 44 with their associated tracks 30 and 32, these wheels are provided with flanges 52' and 44' respectively and the inner and outer pairs of tracks 30 and 32 are provided with T-shaped rails 228 and 230 for rollingly engaging the flanged wheels 52 and 44 in the manner illustrated in FIG. 8. The lower ends of the V-shaped sections 212 of an outer track 32 may be provided with a crosspiece 232 for arrestingly engaging its associated wheel 44 of the rack and guide assembly so as to horizontally dispose the cable-connected end of rack 17 at A as depicted in FIG. 5. If desired, crosspiece 232 of a given outer track 32 may be reinforced by a strut 234.

As best indicated in FIG. 5, the hook and pusher device 32' in another embodiment of the instant invention is generally comprised of first and second L-shaped elements 236 and 238 of different length. The leg section 239 of element 236 is pivotally connected to a plate 240 suspended from bracket assembly 242 affixed to certain girders 166. An intermediate portion of a leg section 239 of element 236 is connected to one side of a plate 244 while the upper end of a leg section 246 of element 238 is connected to the right-hand edge of plate 244 on the one side thereof so that the lower free ends of elements 236 and 238 are arranged in an outwardly divergent relation to each other.

An extensible actuator 248 extends between plates 240 and 244 and is pivotally connected thereto as illustrated in FIG. 5. A cross bar 250 extends transversely between opposed bottom chordal side edge members 34 of the rack and guide assembly and is located at a preselected point at the cable-free end thereof for selective engagement by the hook and pusher device 32' during hoisting of the rack and guide assembly between positions A and B by way of power winch 172, etc.

A rack arresting device 33 may be advantageously used in combination with pusher 32' for precisely orienting the cable-free end of rack in alignment with station pass line L. This device 33 constitutes in effect a pair of girders 252 (only one of which is shown in FIG. 5) extending between and connected to certain adjacent and parallel cross girders 168 at the lower end of lower section 164 of structure 14 as depicted in FIG. 5. The arresting pair of girders 252 are disposed in predetermined fashion between these certain parallel girders 168 for abuttingly engaging opposed wheels 52 of the rack and guide assembly at the cable-free end thereof so as to precisely align the workpieces on the rack and guide assembly with their respective pass line, e.g., L of station S.

When actuator 248 of device 32' is actuated to the right as indicated by dotted and solid lines in FIG. 5, fork elements 236 and 238 of device 32' are pivoted from a retracted left-hand position to an outwardly extending right-hand position.

Meanwhile, rod 250 is disposed below the lower free end of second and right-hand element 238 in an outwardly extended right-hand position upon hoisting of the rack and guide assembly from positions A to B as the rack and guide assembly approaches arresting device 33 in the manner shown in FIG. 5. When rod 250 of the rack and guide assembly is disposed above the lower free end of element 238 in its outward pivotal position, during hoisting of the rack and guide assembly to the upstanding position B, actuator 248 of device 32' is further actuated for pivoting the fork elements 236 and 238 clockwise whereupon right-hand element 238 will hookingly engage rack rod 250 and draw the rack rod toward the arresting device until opposed wheels 52 abut their respective arresting girders 252 thereby orienting the workpieces on the rack and guide assembly with station S.

Upon opposed wheels 52 at the cable-free end of rack 17 initially abutting the girders 252 of device 33 during hoisting of rack and guide assembly 12 from positions A to B, the rack and guide assembly has been hoisted to its highest elevated position B above station S as designated by way of dotted line 254 for opposed wheels 52 of the rack and guide assembly in FIG. 5. At this time, rotation of pulley 182 of power winch 172 is momentarily stopped and reversed in order to lower the rack and guide assembly until the opposed wheels 52 of the rack and guide assembly become seated in the grooves of V-shaped track ends 31.

After the workpieces W while in upstanding position B have been fed into and withdrawn from station S, hook and pusher device 32' and arresting device 33 advantageously cooperate to start the continuous and progressive movement of rack and guide assembly 12 from position B to position A. To this end, pulley 182 of the power winch is rotated clockwise to elevate the rack and guide assembly and disengage wheels 52 from V-shaped ends 31 until the opposed wheels reach their highest elevation above floor F as indicated by dotted line 254 in FIG. 5. Then actuator 248 of device 32' is reactuated to pivot fork elements 236 and 238 counterclockwise from a retracted position to an extended position all as indicated by solid and dotted lines in FIG. 5 whereupon left-hand fork element 236 will abuttingly engage rack rod 250 and push the cable-free end of the rack and guide assembly in a counterclockwise direction about the upper opposed wheels 44 at the upper ends of outer tracks 32.

At the same time fork element 236 of device 32' engages rack rod 250, the pulley 182 is momentarily stopped and reversed in a counterclockwise direction to move the rack and guide assembly from position B to position A. When either wheel 52 rollingly engages the upwardly and outwardly inclined track section 226 of its respective inner track 30 during retransfer of the rack and guide assembly from position B to position A, rack rod 250 will be substantially clear of the ends of fork element 236 and 238 of device 32'. One of the primary advantages of hook and pusher device 32' when used in conjunction with arresting device 33 is that it enables precise alignment of the cable-free end of the rack and guide assembly with the pass line L of station S during hoisting of the rack and guide assembly between positions A and B. Without the use of pusher 32' and arrester 33, it would be difficult for the cable-free end of rack and guide 12, because of its weight, to be aligned with station pass line L.

A cam operable latch device 29 can be advantageously connected to the cable-connected end of the rack and guide assembly if desired. The latch device is generally comprised of a pair of plates 198 as aforementioned. These plates are disposed in transverse alignment and affixed at their bottom longitudinal side edges to an upper plate 256 of rack 17 at the cable-connected end of assembly 12. The right-hand end of a plate 198 includes an inwardly extending generally U-shaped slot 258 for receiving an outer end of shaft 196. Plate 198 on the outwardly facing side thereof is provided with outwardly directed laterally projecting ears 260. An arm 262 disposed between these ears 260 is pivotally connected to the plate at the junction between the leg sections thereof.

A cam follower wheel 264 is rotatably connected to the outer free end of the outwardly inclined segment of an arm 262. As viewed in FIGS. 11–12, a coil spring 266 is interposed between the left-hand reduced portion of one of the plates 198 and the outer segment of an arm 262. Spring 266 biases the other segment 268 of the arm relative to a plate 198. The other segment 268 of an arm 262 includes an opening 270 aligned with the slot 258 of a plate 198 whereby either outer end of shaft 196 is normally inserted in the opening 270 of its respective arm 262 when the other segment of an arm 262 is biased in overlapping engagement with the outwardly facing side of its associated plate 198 all as indicated in FIGS. 11–12 and 17.

A cam device 29' operatively associated with latch mechanism 29 is connected to the top of upper section 166 on the rack facing side of structure 16. It includes a pair of plates 272 affixed in planar aligned relation to various girders 168. The opposed cam edges 274 of plates 272 are cut away in a downward and outward direction to define opposed outwardly beveled edge portions 276.

During hoisting of the rack and guide assembly from positions A to B, cam follower wheels 264 on arms 262 initially engage the beveled plate cam edges 276 and urge the overlapping segments 268 of an arm 262 to be pivoted in a direction outwardly of their plates 198. Continued hoisting of the rack and guide assembly from positions A to B results in cam followers 264 of arms 262 engaging the inner cam edges 274 so as to cause the leg sections 268 of arms 262 to be further pivoted in opposite directions outwardly of their respective plate 198 until the overlapping leg sections 268 of opposed arms 262 are fully disconnected from the outer ends of their associated shaft 196 as indicated in FIG. 17.

It should be noted at this time that the opposed cam edges 274 are of such a length that cam follower wheels 264 will maintain rolling engagement with edges 274 when rack wheels 52 are advanced into and out of the V-shaped track ends 31 during hoisting of the rack and guide assembly to position B.

Since the outer ends of shaft 196 are disconnected from the overlapping sections 268 of the pair of arms 262 when the cam follower wheels 268 of arms 262 are in rolling engagement with cam edges 274, the shaft together with carriage 16 are disconnected from rack 17. This permits carriage and shaft 196 to be progressively lowered and raised between the opposing longitudinal ends of the rack and guide assembly upon further operation of cable hoist mechanism 28 after hoisting the rack and guide assembly to position B. During lowering and raising of the carriage relative to the rack and guide assembly at position B, any rail workpiece W attached to the carriage will be correspondingly lowered and raised into and out of work station S in order to effect cladding of the workpiece.

After cladding of the workpiece rails W and return of carriage 16 to the cable-connected end of the rack and guide assembly as shown in FIG. 12, cable hoist mechanism 28 is selectively operated to retransfer the rack and guide assembly with the metal clad or fully treated workpieces from positions B to A. Since the rack and guide assembly is progressively lowered during its retransfer to position A, shaft 196 is retained in the bottom of slots 258 of plates 198 until cam follower wheels 264 of the pair of arms 262 are disengaged from inner cam edges 274. This allows pivoting of the overlapping sections 268 of the pair of arms into overlapping engagement with the outer ends of shaft 196 so as to securely lock the carriage to the rack and guide assembly. Thus, the cam-operable latch mechanism 29 in conjunction with cam 29' advantageously enables carriage 16, etc., to be selectively released from rack 17 of the rack and guide assembly when the assembly is in the B position.

A full operating cycle of the apparatus of the instant invention will now be described. A plurality of six elongated rail workpieces W are first individually connected at their ends to their respective mounting devices 24 upon the pivoting of a bar 160 of device 26 to an open position and with guide and rack assembly located at position A. After the rails are all properly positioned in grooves 148 of device 25, cable hoist mechanism 28 is actuated and rack and guide assembly 12 hoisted to position B. During positioning of assembly 12 at B, opposed wheels 52 of the rack and guide assembly remain seated in the V-shaped track ends 31 upon actuation of device 32' as aforedescribed. Although the rails are directly carried by device 25 when rack 17 is at position A, the rail becomes progressively partially and then fully supported by its rail mount 24 on carriage 16 as rack and guide 12 is transferred from positions A to B.

With the rack and guide assembly at position B, the cable hoist mechanism is further actuated to progressively lower and raise the carriage thereby correspondingly raising and lowering the workpiece rails W into and out of metal cladding station S so that both sides of the rails can be clad with aluminum as set forth in the prior pending application, Ser. No. 881,169, filed Dec. 1, 1969. With the rails W being directly carried by carriage 16 when the carriage is in the B position, each rail swivels about its mounting device 24. Even though a rail may have variations along its length due to acceptable production tolerances, the rail is free to swivel and pivot about its mounting device 24 within the limits determined by guide and holddown devices 25 and 26 as aforedescribed during continuous passage of the rail into and out of station S. The aforesaid arrangement allows cladding of the rails while avoiding binding engagement between the rail handling equipment and cladding mold guides, etc., in station S. All of this means that the cladding operation can proceed on a production line basis without serious injury or disturbance of the cladding material as it is applied and after it is applied to a rail. Upon retransfer of rack and guide assembly 12 from positions B to A, clad rails W are unloaded at position A and assembly 12 reloaded with unclad rails W. The apparatus 10 is now ready for another full operating cycle.

Although the apparatus has been described in connection with cladding of at least one rail W, it could be used for handling other workpieces such as the dip-coating of pipes, etc. Even though rack and guide assembly 12 has moved in a curvilinear fashion between stations A and B or in a linear fashion into and out of station S when the assembly is positioned at B, the rack and guide assembly could move, e.g., in a linear fashion between A and B or a somewhat curvilinear fashion when the assembly is at B. Moreover, the carriage could be slidably connected to guide 18 in various ways. For example, an opposed side edge of carriage 16 could be provided with a dovetail groove for receiving a guide element 54 instead of wheel and guide device 60.

Advantageous embodiments of the invention have been shown and described. It will be obvious to those skilled in the art that various changes can be made without departing from the appended claims.

What is claimed is:

1. An apparatus for handling and orienting a workpiece relative to a generally vertical pass line of a workpiece treating station, said apparatus comprising rack and guide means and a carriage selectively alignable with the pass line of the station, means on said carriage for so mounting a workpiece on the carriage whereby the carriage can directly carry the workpiece when said rack and guide means are aligned with the pass line of the station, means releasably connecting and supporting said carriage on the rack portion of said rack and guide means, means slidably connecting the carriage to the guide portion of said rack and guide means whereby said carriage can move relative to the guide portion of said rack and guide means upon the release of said carriage from the said rack portion when the rack and guide means are aligned with the pass line of the treating station, said means releasably connecting said carriage on said rack portion of said rack and guide means including latch means connected to said rack portion for releasing said carriage from said rack portion to allow advancement of said carriage together with a workpiece in a direction towards the treatment station when said rack and guide means are aligned with the workpiece treating station pass line, and a track means for guiding and supporting the rack portion of said rack and guide means relative to the station pass line.

2. An apparatus as set forth in claim 1 including means connected to said rack and guide means for moving said rack and guide means from a horizontal position to an upstanding position and vice versa.

3. An apparatus as set forth in claim 2 wherein said moving means includes stop means for engaging the rack portion of said rack and guide means in order to precisely align said rack and guide means with the station pass line.

4. An apparatus as set forth in claim 2 wherein said moving means includes a superstructure having said track means.

5. An apparatus as set forth in claim 1 including hoist means connected to said carriage for elevating and aligning said carriage and said rack and guide means with the station pass line and for selectively advancing said carriage in a direction towards the station pass line upon the release of said carriage from the rack portion of said rack and guide means when said rack and guide means are aligned with the pass line of the station.

6. An apparatus as set forth in claim 1 in which the carriage includes wheel and guide means for slidably connecting said carriage to the guide portion of said rack and said guide means.

7. An apparatus for handling and orienting a workpiece relative to the generally vertical pass line of a workpiece treating station, said apparatus comprising a superstructure, a rack and guide means and a carriage, means for mounting said rack and guide means and said carriage on said superstructure and for supporting and aligning said rack and guide means and said carriage with the treating station pass line, means on said carriage for so mounting a workpiece on the carriage whereby the carriage can directly carry the workpiece when said rack and guide means are aligned with the pass line of the station, means releasably connecting and supporting the carriage on the rack portion of said rack and guide means, means slidably connecting the carriage to the guide portion of the said rack and guide means whereby said carriage can move relative to the guide portion of said rack and guide means upon the release of said carriage from the said rack portion when the rack and guide means are aligned with the station pass line, said means releasably connecting the carriage on the rack portion of said rack and guide means including latch means connected to said rack portion for releasing said carriage from said rack portion and said superstructure including cam means for effecting disengagement of said latch means to effect release of said carriage from said rack portion so as to allow advancement of said carriage together with a workpiece in a direction towards the treatment station when said rack and guide means are aligned with the station pass line.

8. An apparatus as set forth in claim 7 in which said mounting means includes stop means for engaging the rack portion of said rack and guide means in order to precisely align said rack and guide means with the station pass line.

9. An apparatus as set forth in claim 7 including hoist means connected to said carriage means for elevating and aligning said carriage and said rack and guide means with the station pass line and for advancing said carriage together with a workpiece in a direction towards the station when said rack and guide means are aligned with the station pass line.

10. An apparatus as set forth in claim 7 in which the rack portion of said rack and guide means is comprised of workpiece positioning and guiding means for positioning a workpiece at selected times and for guiding the movements of a workpiece when the rack and guide means are aligned with the station pass line.

11. An apparatus as set forth in claim 7 in which the rack portion of said rack and guide assembly includes means for holding a workpiece on the rack portion during alignment of said rack and guide means with the station pass line.

12. An apparatus as set forth in claim 7 in which said carriage includes wheel and guide means for slidably connecting said carriage to the guide portion of said rack and guide means.

13. An apparatus for handling and orienting a workpiece relative to the pass line of a workpiece treating station, said apparatus comprising rack and guide means and a carriage selectively alignable with the pass line of the station, means on said carriage for so mounting a workpiece on the carriage whereby the carriage can directly carry the workpiece when said rack and guide means are aligned with the pass line of the station, means releasably connecting and supporting said carriage on the rack portion of said rack and guide means, means slidably connecting the carriage to the guide portion of said rack and guide means whereby said carriage can move relative to the guide portion of said rack and guide means upon the release of said carriage from the said rack portion when the rack and guide means are aligned with the pass line of the treating station, means connected to said rack portion for releasing said carriage from said rack portion to allow advancement of said carriage together with a workpiece in a direction towards the workpiece treating station when said rack and guide means are aligned with the workpiece treating station pass line, means connected to said rack and guide means for moving said rack and guide means from a horizontal position to an upstanding position and vice versa, said moving means including stop means for engaging the rack portion of said rack and guide means in order to precisely align said rack and guide means with the station pass line, and hook and pusher means for selectively engaging the rack portion of said rack and guide means and for drawing the rack and guide means into and out of engagement with said stop means.

14. An apparatus for handling and orienting a workpiece relative to the pass line of a workpiece treating station, said apparatus comprising rack and guide means and a carriage selectively alignable with the pass line of the station, means on said carriage for so mounting a workpiece on the carriage whereby the carriage can directly carry the workpiece when said rack and guide means are aligned with the pass line of the station, means releasably connecting and supporting said carriage on the rack portion of said rack and guide means, means slidably connecting the carriage to the guide portion of said rack and guide means whereby said carriage can move relative to the guide portion of said rack and guide means upon the release of said carriage from the said rack portion when the rack and guide means are aligned with the pass line of the treating station, means connected to said rack portion for releasing said carriage from said rack portion to allow advancement of said carriage together with a workpiece in a direction towards the treatment station when said rack and guide means are aligned with the workpiece treating station pass line, and said carriage workpiece mounting means including swivel means for mounting the workpiece about the longitudinal axis of said carriage.

15. An apparatus as set forth in claim 14 in which the rack portion of said rack and guide means includes means for limiting the swivel movements of the workpiece relative to said carriage.

16. An apparatus for handling and orienting a workpiece relative to the pass line of a workpiece treating station, said apparatus comprising a superstructure, a rack and guide means and a carriage, means for mounting said rack and guide means and said carriage on said superstructure and for supporting and aligning said rack and guide means and said carriage with the treating station pass line, means on said carriage for so mounting a workpiece on the carriage whereby the carriage can directly carry the workpiece when said rack and guide means are aligned with the pass line of the station, means releasably connecting and supporting the carriage on the rack portion of said rack and guide means, means slidably connecting the carriage to the guide portion of the said rack and guide means whereby said carriage can move relative to the guide portion of said rack and guide means upon the release of said carriage from the said rack portion when the rack and guide means are aligned with the station pass line, latch means connected to said rack portion for releasing said carriage from said rack portion to allow advancement of said carriage together with a workpiece in a direction towards the treatment station when said rack and guide means are aligned with the station pass line, said mounting means including stop means for engaging the rack portion of said rack and guide means in order to precisely align said rack and guide means with the station pass line, and hook and pusher means for selectively engaging the rack portion of said rack and guide means and for drawing the rack and guide means into and out of engagement with said stop means.

17. An apparatus for handling and orienting a workpiece relative to the pass line of a workpiece treating station, said apparatus comprising a superstructure, a rack and guide means and a carriage, means for mounting said rack and guide means and said carriage on said superstructure and for supporting and aligning said rack and guide means and said carriage with the treating station pass line, means on said carriage for so mounting a workpiece on the carriage whereby the carriage can directly carry the workpiece when said rack and guide means are aligned with the pass line of the station, means releasably connecting and supporting the carriage on the rack portion of said rack and guide means, means slidably connecting the carriage to the guide portion of the said rack and guide means whereby said carriage can move relative to the guide portion of said rack and guide means upon the release of said carriage from the said rack portion when the rack and guide means are aligned with the station pass line, latch means connected to said rack portion for releasing said carriage from said rack portion to allow advancement of said carriage together with a workpiece in a direction towards the treatment station when said rack and guide means are aligned with the station pass line, and said superstructure including track means for supporting and aligning the rack portion of said rack and guide means with the station pass line, and the rack portion of said rack and guide means having opposed pairs of wheels at opposite ends thereof for engaging said track means during the alignment of said rack and guide means with the station pass line.

18. An apparatus as set forth in claim 17 in which said track means are of curvilinear shape.

19. An apparatus as set forth in claim 17 wherein said track means are comprised of two pairs of inner and outer parallel and spaced track elements and wherein the opposed pairs of wheels are laterally offset relative to each other for separately engaging various track elements of said inner and outer track means.

20. An apparatus as set forth in claim 17 in which said track means includes upwardly facing generally V-shaped notched portions for releasably receiving one pair of wheels of said pairs of wheels when said rack and guide means is aligned with the station pass line.

21. An apparatus for handling and orienting a workpiece relative to the pass line of a workpiece treating station, said apparatus comprising a superstructure, a rack and guide means and a carriage, means for mounting said rack and guide means and said carriage on said superstructure and for supporting and aligning said rack and guide means and said carriage with the treating station pass line, means on said carriage for so mounting a workpiece on the carriage whereby the carriage can directly carry the workpiece when said rack and guide means are aligned with the pass line of the station, means releasably connecting and supporting the carriage on the rack portion of said rack and guide means, means slidably connecting the carriage to the guide portion of the said rack and guide means whereby said carriage can move relative to the guide portion of said rack and guide means upon the release of said carriage from the said rack portion when the rack and guide means are aligned with the station pass line, latch means connected to said rack portion for releasing said carriage from said rack portion to allow advancement of said carriage together with a workpiece in a direction towards the treatment station when said rack and guide means are aligned with the station pass line, and said carriage workpiece mounting means including swivel means for mounting a workpiece about the longitudinal axis of said carriage.

22. An apparatus as set forth in claim 21 in which said swivel means includes means for limiting the swivel movement of a workpiece to about 7°.

23. An apparatus for handling and orienting a workpiece relative to the pass line of a workpiece treating station, said apparatus comprising a superstructure, a rack and guide means and a carriage, means for mounting said rack and guide means and said carriage on said superstructure and for supporting and aligning said rack and guide means and said carriage with the treating station pass line, means on said carriage for so mounting a workpiece on the carriage whereby the carriage can directly carry the workpiece when said rack and guide means are aligned with the pass line of the station, means releasably connecting and supporting the carriage on the rack portion of said rack and guide means, means slidably connecting the carriage to the guide portion of the said rack and guide means whereby said carriage can move relative to the guide portion of said rack and guide means upon the release of said carriage from the said rack portion when the rack and guide means are aligned with the station pass line, latch means connected to said rack portion for releasing said carriage from said rack portion to allow advancement of said carriage together with a workpiece in a direction towards the treatment station when said rack and guide means are aligned with the station pass line, and said superstructure including cam means for engaging said latch means in order to effect a release of said carriage from said rack portion of said rack and guide means when said rack and guide means are aligned with the station pass line.

* * * * *